US009490492B2

(12) United States Patent
Yamamoto et al.

(10) Patent No.: US 9,490,492 B2
(45) Date of Patent: Nov. 8, 2016

(54) AIR SUPPLY AND EXHAUST STRUCTURE FOR FUEL CELL

(71) Applicants: SUZUKI MOTOR CORPORATION, Shizuoka-Ken (JP); Tomoharu Yamamoto, Shizuoka-Ken (JP); Kengo Ikeya, Shizuoka-Ken (JP); Yoshifumi Takai, Shizuoka-Ken (JP)

(72) Inventors: Tomoharu Yamamoto, Shizuoka-Ken (JP); Kengo Ikeya, Shizuoka-Ken (JP); Yoshifumi Takai, Shizuoka-Ken (JP)

(73) Assignee: SUZUKI MOTOR CORPORATION, Shizuoka-Ken (JP)

(*) Notice: Subject to any disclaimer, the term of this patent is extended or adjusted under 35 U.S.C. 154(b) by 465 days.

(21) Appl. No.: 13/886,297

(22) Filed: May 3, 2013

(65) Prior Publication Data
US 2013/0302713 A1 Nov. 14, 2013

(30) Foreign Application Priority Data

May 9, 2012 (JP) ................................. 2012-107529

(51) Int. Cl.
*H01M 8/04* (2016.01)
*H01M 8/24* (2016.01)

(52) U.S. Cl.
CPC ....... *H01M 8/04201* (2013.01); *H01M 8/0435* (2013.01); *H01M 8/04761* (2013.01);
(Continued)

(58) Field of Classification Search
CPC ......... H01M 8/0409; H01M 8/04201; H01M 8/04223; H01M 8/04225; H01M 8/04228; H01M 8/04; H01M 8/04253; H01M 8/04268; H01M 8/0432; H01M 8/04328; H01M 8/04335; H01M 8/04343; H01M 8/0435; H01M 8/04358; H01M 8/04365; H01M 8/04373
See application file for complete search history.

(56) References Cited

U.S. PATENT DOCUMENTS 3,070,345 A * 12/1962 Knecht ................... F16K 1/223
126/285 R
3,994,748 A * 11/1976 Kunz ....................... H01M 8/00
429/458
(Continued)

FOREIGN PATENT DOCUMENTS

JP 63-216269 * 9/1988 .............. H01M 8/04
JP 2005116185 A 4/2005
(Continued)

OTHER PUBLICATIONS

Federal Register, vol. 76, No. 27, pp. 7162-7175, issued Feb. 9, 2011, which details Supplementary Examination Guidelines for Determining Compliance with 35 U.S.C. 112 and for Treatment of Related Issues in Patent Applications.*

(Continued)

*Primary Examiner* — Ula C Ruddock
*Assistant Examiner* — Amanda Barrow
(74) *Attorney, Agent, or Firm* — Barnes & Thornburg LLP

(57) ABSTRACT

An air supply and exhaust structure for supplying a reaction air to a fuel cell and exhausting the reaction air passing through the fuel cell includes: an intake duct configured to guide reaction air to the fuel cell; an exhaust duct configured to discharge the reaction air passing through the fuel cell to an outside of the fuel cell; a blower provided in the exhaust duct and configured to suck the reaction air passing through the fuel cell to promote discharge of the reaction air; and an exhaust side shield unit which is disposed inside the exhaust duct and between the fuel cell and the blower and configured to temporarily block the reaction air discharged from the fuel cell and to retain the reaction air in a periphery of the fuel cell so as to introduce the reaction air to the fuel cell.

5 Claims, 8 Drawing Sheets

(52) U.S. Cl.
CPC ....... *H01M8/2465* (2013.01); *H01M 8/04097* (2013.01); *H01M 2250/20* (2013.01); *Y02E 60/50* (2013.01); *Y02T 90/32* (2013.01)

(56) References Cited

U.S. PATENT DOCUMENTS

| | | | | |
|---|---|---|---|---|
| 5,560,999 | A * | 10/1996 | Pedicini | H01M 10/613 429/407 |
| 6,238,817 | B1 * | 5/2001 | Reiser | H01M 8/04089 429/408 |
| 6,497,971 | B1 * | 12/2002 | Reiser | H01M 8/04089 429/432 |
| 6,503,650 | B1 * | 1/2003 | Yasuo | H01M 8/04156 429/459 |
| 6,936,359 | B2 * | 8/2005 | Kobayashi | H01M 8/04007 429/415 |
| 2002/0055023 | A1 * | 5/2002 | Rueegge et al. | 429/13 |
| 2006/0275645 | A1 * | 12/2006 | Gallagher et al. | 429/38 |
| 2008/0063907 | A1 * | 3/2008 | Takahashi et al. | 429/14 |
| 2008/0138692 | A1 * | 6/2008 | Mogi | H01M 8/04007 429/414 |
| 2011/0117470 | A1 * | 5/2011 | Aras | H01M 8/04014 429/452 |
| 2011/0281190 | A1 * | 11/2011 | Skinkle | H01M 8/04014 429/433 |
| 2012/0070757 | A1 * | 3/2012 | Katano | 429/444 |
| 2012/0214077 | A1 * | 8/2012 | Garrettson | H01M 8/04014 429/429 |
| 2013/0202979 | A1 * | 8/2013 | Katano et al. | 429/444 |

FOREIGN PATENT DOCUMENTS

| | | | |
|---|---|---|---|
| JP | 2007184110 A | 7/2007 | |
| JP | 2008135267 A | 6/2008 | |
| JP | 2009026486 A | 2/2009 | |
| JP | WO 2012/007989 | * 1/2012 | ............. H01M 8/04 |
| WO | 00/54357 A1 | 9/2000 | |

OTHER PUBLICATIONS

Extended European Search Report for European Patent No. 13165389.1 dated Sep. 9, 2013.

* cited by examiner

AIR SUPPLY AND EXHAUST STRUCTURE FOR FUEL CELL

PRIORITY CLAIM

This patent application claims priority to Japanese Patent Application No. 2012-107529, filed 9 May 2012, the disclosure of which incorporated herein by reference in its entirety.

BACKGROUND OF THE INVENTION

1. Field of the Invention

The present invention relates to an air supply and exhaust structure for a fuel cell for supplying reaction air to the fuel cell and discharging the reaction air passing through the fuel cell.

2. Related Art

A fuel cell, particularly an air-cooling fuel cell, takes in reaction air by operation of a blower and also performs cooling with use of the reaction air. However, at the time of low temperature such as in winter and other occasions, the fuel cell is put in a supercooled state, which may deteriorate starting performance of the fuel cell. As a countermeasure to solve such defective matter, Patent Document 1 (Japanese Patent Laid-Open No. 2007-184110) and Patent Document 2 (Japanese Patent Laid-Open No. 2009-26486) disclose a technology of using air warmed by a fuel cell.

More specifically, in Patent Document 1, a heat exchanger is placed inside an exhaust duct, and exhaust heat is transmitted via a heat carrier to a heat exchanger disposed inside an intake duct so as to warm the reaction air to be introduced to a fuel cell, and according to such manner, the starting performance of the fuel cell at the time of low temperature is enhanced. In Patent Document 2, exhaust air (warm air) discharged from a condenser is introduced to a periphery of the fuel cell through an air conduit, and according to such manner, the starting performance of the fuel cell at the time of low temperature is enhanced.

However, in the technologies in Patent Documents 1 and 2, it is required to arrange a pipe or an air conduit for circulating a heat carrier in a fuel cell system, which leads to the upsizing of the fuel cell system and complicated structure, and which hence results in negative effect for mounting the fuel cell system to a vehicle.

SUMMARY OF THE INVENTION

The present invention was conceived in consideration of the circumstances encountered in the prior art mentioned above and an object of the present invention is to provide an air supply and exhaust structure for a fuel cell capable of enhancing starting performance of the fuel cell at a time of low temperature without causing upsizing and complication of the structure.

The above and other objects can be achieved according to the present invention by providing an air supply and exhaust structure for supplying a reaction air to a fuel cell and exhausting the reaction air passing through the fuel cell, including: an intake duct configured to guide reaction air to the fuel cell; an exhaust duct configured to discharge the reaction air passing through the fuel cell to an outside of the fuel cell; a blower provided in the exhaust duct and configured to suck the reaction air passing through the fuel cell to promote discharge of the reaction air; and an exhaust side shield unit which is disposed inside the exhaust duct and between the fuel cell and the blower and configured to temporarily block the reaction air discharged from the fuel cell and to retain the reaction air in a periphery of the fuel cell so as to introduce the reaction air to the fuel cell.

In embodiments of the above aspect of the present invention, the following preferred modes may be taken.

The exhaust side shield unit may be a movable vane having opening/closing state is changed in response to a state of the fuel cell. The movable vane may be provided in a direction parallel to a mounting direction of cells constituting the fuel cell in a fully closed state.

It may be desired that the air supply and exhaust structure for a fuel cell may further include a temperature detection unit configured to detect temperature inside or around the fuel cell, wherein the opening/closing state of the movable vane is changed based on a detected temperature detected by the temperature detection unit.

It may be further desired that the air supply and exhaust structure for a fuel cell further include a temperature distribution detection unit configured to detect a temperature distribution inside or around the fuel cell, wherein a plurality of movable vanes are disposed placed in a direction orthogonal to the mounting direction of the cells constituting the fuel cell, and respective opening/closing states of a plurality of the movable vanes are separately changed based on the temperature distribution detected by the temperature distribution detection unit.

The exhaust side shield unit may be provided in a portion in a vicinity of the fuel cell.

The exhaust side shield unit may be configured to form an opening in substantially a U-shape or substantially a V-shape that faces the fuel cell.

It may be further desired that an intake side shield unit section is disposed inside the intake duct and configured to reverse a flow of the reaction air passing through the fuel cell with a function of the exhaust side shield unit and to introduce the reaction air to the fuel cell.

The air supply and exhaust structure for a fuel cell may be preferably provided for a fuel cell mounting vehicle such as motorcycle.

According to the present invention of the structures and characters mentioned above, the exhaust side shield unit temporarily blocks the reaction air discharged from the fuel cell and retains the reaction air in a periphery of the fuel cell so as to introduce the reaction air to the fuel cell. Accordingly, the reaction air is introduced to the fuel cell a plurality of times to have reactions, so that temperature increase is promoted. This makes it possible to promptly heat the fuel cell, through which the reaction air passes, up to an appropriate operating temperature, and accordingly, the starting performance of the fuel cell at the time of low temperature can be enhanced without causing upsizing and complication.

The nature and further characteristic functions and effects will be made clearer from the following descriptions made with reference to the accompanying drawings.

BRIEF DESCRIPTION OF THE DRAWINGS

FIGS. 4A and 4B are plan views illustrating the first embodiment of the air supply and exhaust structure for a fuel cell shown in FIG. 3, in which FIG. 4A represents a state at a normal operation period and FIG. 4B represents a state at a low-temperature start operation period;

FIGS. 5A and 5B are plan views showing a modification of the first embodiment of the air supply and exhaust structure for a fuel cell shown in FIG. 3, in which FIG. 5A represents a state at a normal operation period and FIG. 5B represents a state at a low-temperature start operation period;

FIGS. 7A and 7B are plan views showing the second embodiment of the air supply and exhaust structure for a fuel cell shown in FIG. 6, in which FIG. 7A represents a first pattern showing a state at a low-temperature start operation period and FIG. 7B represents a second pattern showing a state at a low-temperature start operation period; and FIGS. 8A and 8B are plan views showing a modification of the second embodiment of the air supply and exhaust structure for a fuel cell shown in FIG. 6, in which FIG. 8A represents a third pattern showing a state at a low-temperature start operation period and FIG. 8B represents a fourth pattern showing a state at a low-temperature start operation period.

DESCRIPTION OF THE PREFERRED EMBODIMENT

Figure 1:
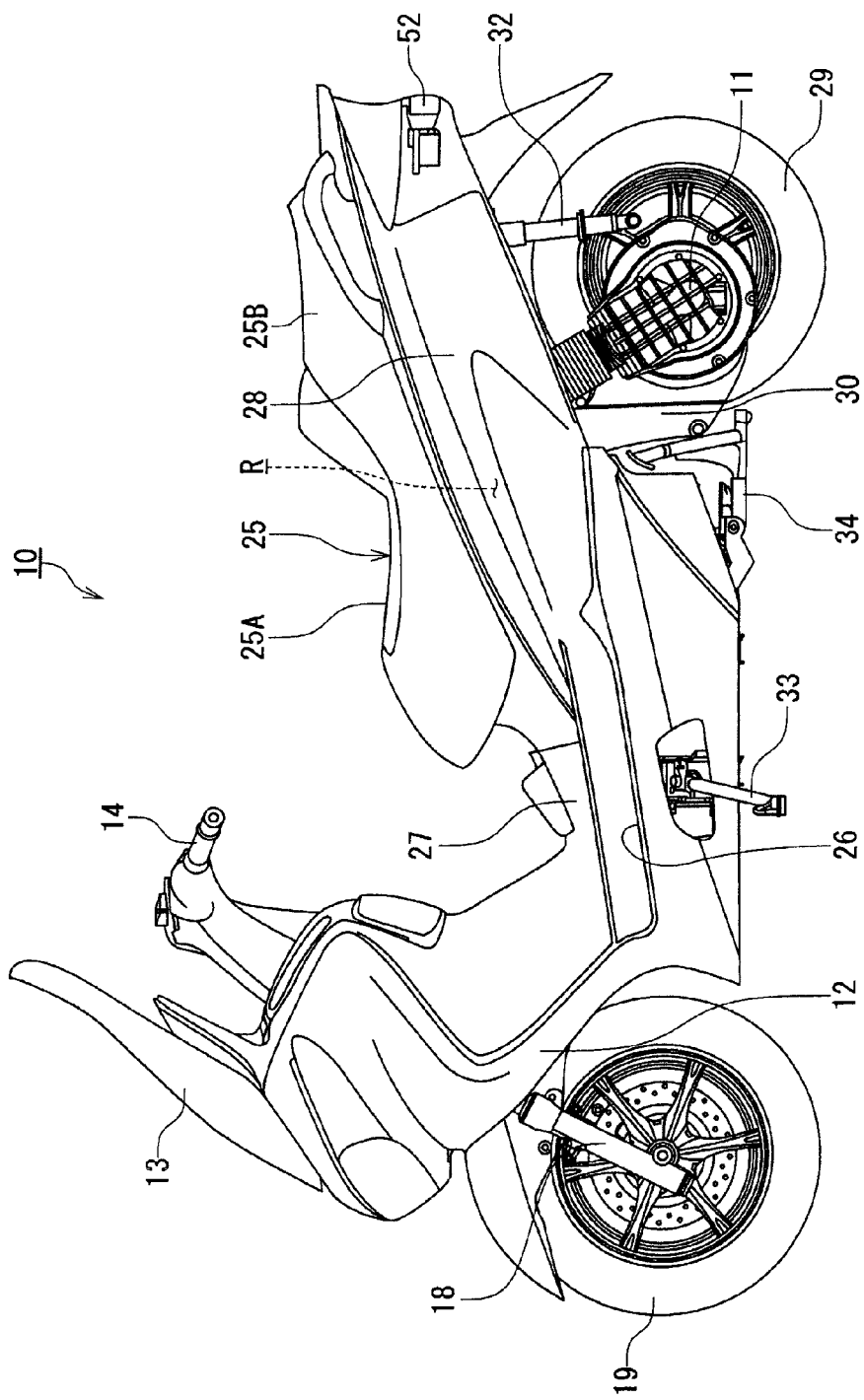
FIG. 1 is a left side view illustrating a scooter type motorcycle to which an air supply and exhaust structure for a fuel cell according to a first embodiment of the present invention is applied.

Hereunder, embodiments for embodying the present invention will be described with reference to the accompanying drawings, in which it is to be noted that terms indication directions such as "upper", "lower", "right", "left" and the like are used in the state illustrated in the drawings or in a state of a driver who is riding a vehicle.

[First embodiment (FIGS. 1 to 5)]

Figure 2:
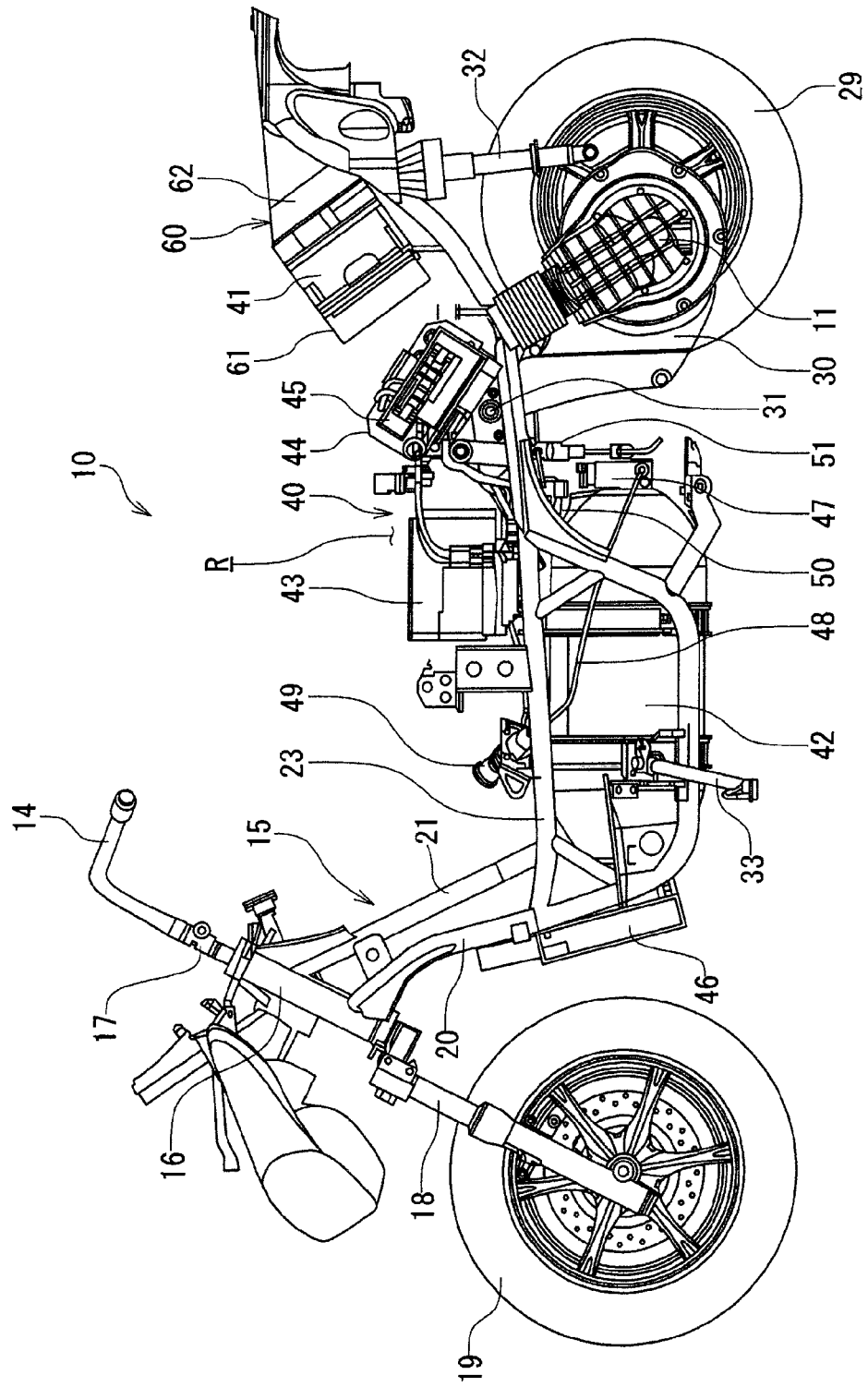
FIG. 2 is a left side view illustrating the scooter type motorcycle of FIG. 1 particularly showing a vehicle body frame and a fuel cell driver system thereof.

With reference to FIG. 1, a scooter type motorcycle 10 as a small-size vehicle of this embodiment is a fuel cell mounted vehicle which is driven by rotating a motor 11 with use of electric power obtained from a later-described fuel cell drive system 40 (FIG. 2).

The scooter type motorcycle 10 includes a leg shield 12, a screen 13, and a handle bar 14 which protrude in a left-right (lateral) direction in a front part of the vehicle as shown in FIG. 1.

The handle bar 14 is connected so as to be integrally rotated with a steering shaft 17 that is pivotably supported by a head pipe 16 of a vehicle body frame 15 shown in FIG. 2. A front wheel 19 is suspended on the steering shaft 17 via a pair of left and right front forks 18. Since the steering shaft 17 is pivotably supported by the head pipe 16 so as to be able to rotate in the left-right direction, the front wheel 19 is rotated in the left-right direction by handling of the handle bar 14.

The vehicle body frame 15 includes the head pipe 16 at a front end portion. A pair of down tubes 20 and 21 including a left down tube 20 positioned forward and a right down tube 21 positioned rearward, respectively, which extend from upper and lower portions of the head pipe 16. The front-side down tube 20 has a lower portion which is bent and extends rearward (backward) of the vehicle body and is then bent upward at substantially a center portion in the front-rear (longitudinal) direction of the vehicle body.

Further, a pair of left and right main tubes 23 extends rearward from substantially a center position in the vertical (up-down) direction in the front-side down tube 20. The main tube 23 is connected to a lower end portion of the rear-side down tube 21 and is also connected to a rear end portion of the front-side down tube 20.

As shown in FIG. 1, in the scooter type motorcycle 10, a twin-seater double seat 25 is disposed behind the leg shield 12 in the front part of the vehicle. In a range from the leg shield 12 to the double seat 25, a pair of left and right plate-shaped footboards 26, on which riders (a driver, a passenger) who sit on the double seat 25 put their both feet, extends and also a center tunnel cover 27 is disposed in this range. The center tunnel cover 27 swells upwards between a pair of the left and right footboards 26 and continues behind the leg shield 12.

A rear cover 28 as a vehicle body cowl is disposed continuously behind the center tunnel cover 27 under the double seat 25. The rear cover 28 is configured to cover an under-seat region R under the double seat 25 which is a rear part of the vehicle. More specifically, the rear cover 28 covers the main tube 23, the front-side down tube 20, or the like in the vehicle body frame 15 arranged in the lower region R of the seat, as well as most of fuel cell associated parts (a fuel cell 41, a fuel tank 42, a secondary cell 43, a power controller 44, a motor controller 45, or the like described herein later) in the fuel cell driver system 40.

Under the rear cover 28, a swing arm 30 equipped with a motor 11 that drives a rear wheel 29 is pivotably supported so as to be swingable in the vertical direction with a pivot 31 of the main tube 23 shown in FIG. 2 as a supporting point. A reaction unit 32 is hung between the swing arm 30 and the main tube 23. With the reaction unit 32, the motor 11 and the rear wheel 29 are buffered from shaking in the vertical direction and are suspended. Further, a reference numeral 33 in FIG. 2 denotes a side stand, and a reference numeral 34 in FIG. 1 denotes a center stand.

The fuel cell driver system 40 is configured to include, as shown in FIG. 2, fuel cell associated components or parts such as a fuel cell 41, a fuel tank 42, a secondary cell (driving cell) 43, a power controller 44, a motor controller 45, a vehicle controller 46, and an air supply and exhaust structure for a fuel cell 60.

Among these components or parts, the fuel tank 42 is supported by a pair of the left and right main tubes 23 and the front-side down tube 20 in the state of being surrounded with the main tubes 23 and the front-side down tube 20, and is accommodated in a region ranging from an inside of the center tunnel cover 27 to a lower side of the under-seat region R inside the rear cover 28.

The secondary cell 43, the power controller 44, the motor controller 45, and the fuel cell 41 are supported by the main tube 23, and are accommodated in an upper side of the under-seat region R of the seat inside the rear cover 28. The secondary cell 43, the power controller 44, and the fuel cell 41 are arranged in this order from the vehicle front side, while the motor controller 45 is disposed, for example, on a left lateral side of the power controller 44. Further, the vehicle controller 46 is supported by the lower side of the front-side down tube 20 and is accommodated inside the leg shield 12.

The fuel tank 42 stores hydrogen in the state of high-pressure gas. The fuel tank 42 is provided with a main stop valve 47 attached to an outlet portion, and the main stop valve 47 is connected to a fuel filling port 49 through a filling pipe 48. The fuel filling port 49 is formed on the main tube 23 at a position on the center tunnel cover 27.

High-pressure gaseous fuel (gaseous hydrogen) is injected from the fuel filling port 49 to fill the fuel tank 42 through the filling pipe 48 and the main stop valve 47.

Furthermore, the main stop valve 47 is connected to a pressure control valve 50, and the pressure control valve 50 is connected to the fuel cell 41 through a secondary decompression valve 51. The high-pressure gaseous fuel (gaseous hydrogen) in the fuel tank 42 passes through the main stop valve 47 and is decompressed by the pressure control valve 50, before being supplied to the fuel cell 41 through the secondary decompression valve 51. The main stop valve 47, the filling pipe 48, and the pressure control valve 50 described above are arranged on the lower side of the lower region R of the sheet inside the rear cover 28 like the fuel tank 42, while the secondary decompression valve 51 is disposed in a range from the lower side to the upper side of the lower region R of the sheet.

In the fuel cell 41, gaseous fuel (gaseous hydrogen) supplied from the fuel tank 42 is chemically reacted with oxygen included in air to generate electric power. Humid exhaust containing water steam generated in the chemical reaction is discharged from an exhaust port 52 (FIG. 1). The fuel cell 41 is mounted below a tandem seat portion 25B (described herein later) of the double seat 25 shown in FIG. 1 in the present embodiment.

The secondary cell 43 stores surplus electric power generated in the fuel cell 41 or supplies the stored electric power to the motor 11 through the motor controller 45. The power controller 44 controls electric power generated by the fuel cell 41, and stores, in the secondary cell 43, the surplus electric power generated in the fuel cell 41 or supplies the electric power stored in the secondary cell 43 to the motor 11 through the motor controller 45.

Further, the motor controller 45 controls drive of the motor 11. The secondary cell 43, the power controller 44, and the motor controller 45 are placed under a rider seat portion 25A (described later) of the double seat 25 shown in FIG. 1.

The vehicle controller 46 controls the operation of the scooter type motorcycle 10 incorporating the fuel cell driver system 40.

That is, at the time of driving on a flat road at which electric power required for driving the scooter type motorcycle 10 is relatively small, the electric power generated by the fuel cell 41 is supplied to the motor 11 through the power controller 44 and then the motor controller 45, while surplus electric power is stored in the secondary cell 43 through the power controller 44.

In the meantime, at the time of acceleration or uphill driving at which the electric power required for driving the scooter type motorcycle 10 is relatively large, the vehicle controller 46 supplies the electric power generated by the fuel cell 41 to the motor 11 through the power controller 44 and then the motor controller 45, while supplying the electric power stored in the secondary cell 43 to the motor 11 through the power controller 44 and then the motor controller 45.

Figure 3:
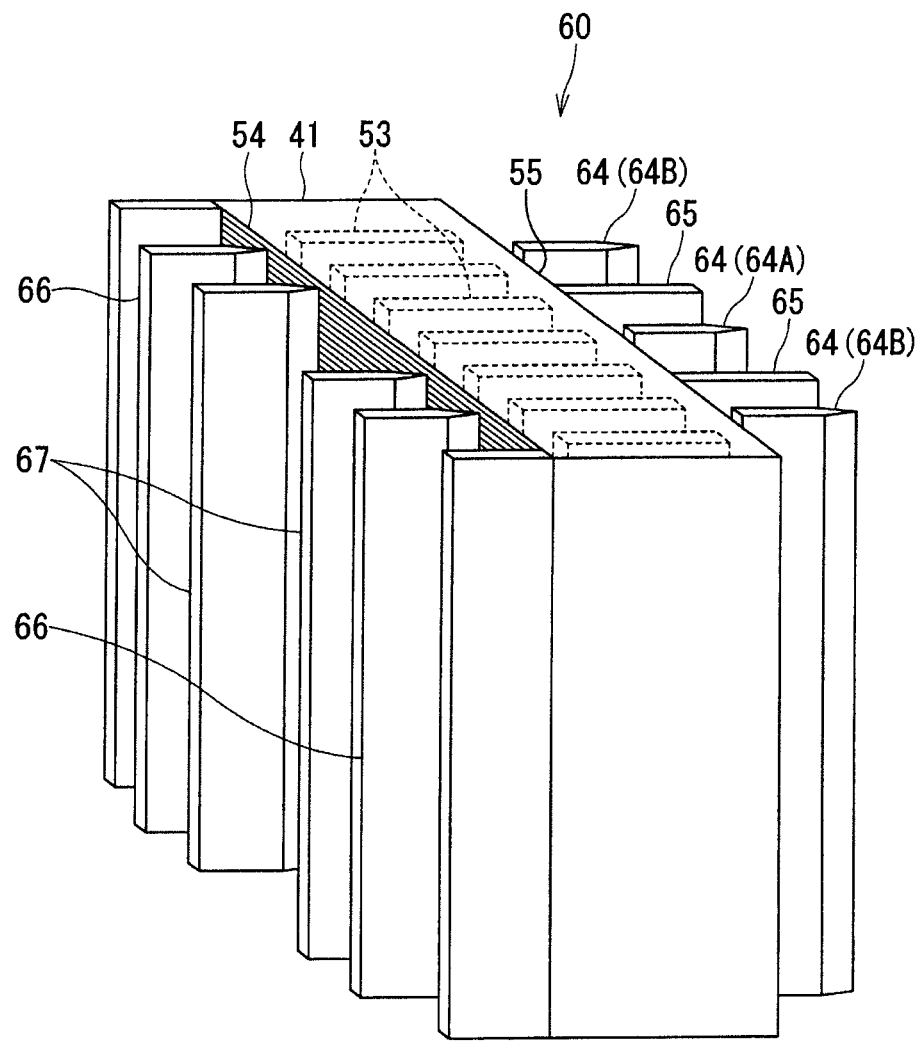
FIG. 3 is a perspective view illustrating the first embodiment of the air supply and exhaust structure for a fuel cell applied to the scooter type motorcycle in FIGS. 1 and 2.

With reference to FIGS. 3 and 4 showing the air supply and exhaust structure for a fuel cell 60, the structure is configured to supply reaction air, which is also used for cooling, to the air-cooling fuel cell 41 and to discharge the reaction air passing through the fuel cell 41. The air supply and exhaust structure for a fuel cell 60 includes an intake duct 61, an exhaust duct 62, a blower 63, an exhaust side movable vane 64 as the exhaust side shield unit, an exhaust side stationary vane 65, an intake side movable vane 66 as an intake side shield section, an intake side stationary vane 67, and a temperature sensor 68 as the temperature detection unit.

The intake duct 61 is placed so as to cover a periphery of an intake port 54 of the fuel cell 41, and reaction air is guided into the fuel cell 41 through the intake port 54. The exhaust duct 62 is provided so as to cover a periphery of an exhaust port 55 of the fuel cell 41 and is configured to discharge the reaction air passing through the fuel cell 41 and flowed outward from the exhaust port 55.

The blower 63 is disposed in a downstream end portion of the exhaust duct 62 so as to suck the reaction air passing through the fuel cell 41 to promote the discharge of the reaction air to the outside. The blower 63 may be placed in both or either one of the exhaust duct 62 and the intake duct 61. In the case where the blower 63 is placed in the intake duct 61, the blower 63 functions to actively send the reaction air to the fuel cell 41 and promoting discharge of the reaction air passing through the fuel cell 41.

Figure 4A:
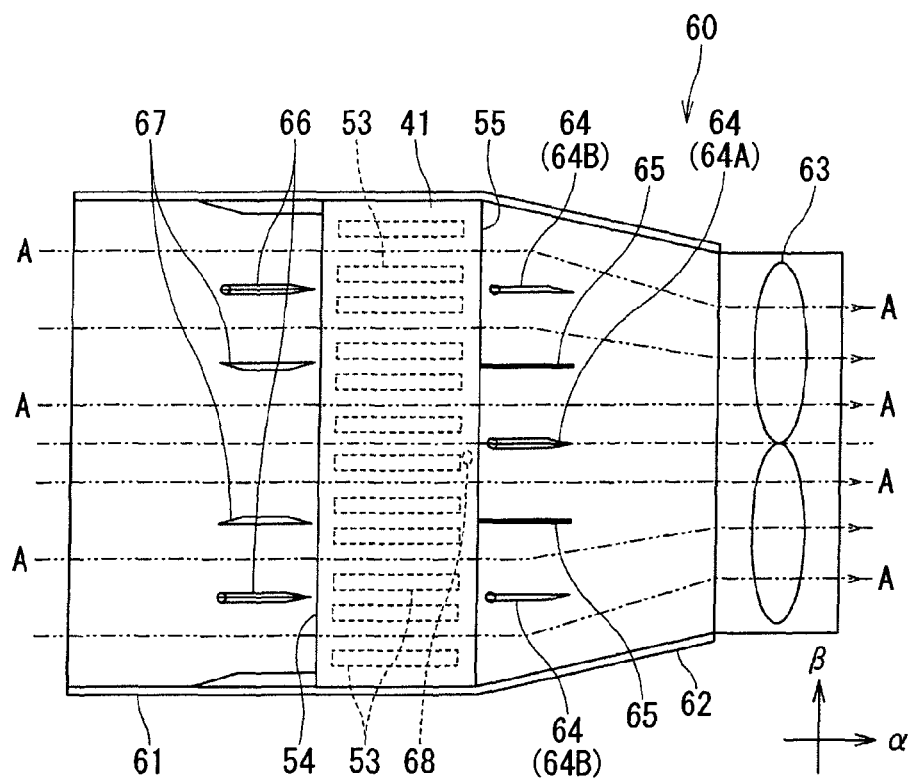

The exhaust side movable vane 64 and the exhaust side stationary vane 65 are provided at positions in the vicinity of the exhaust port 55 of the fuel cell 41 inside the exhaust duct 62 and between the fuel cell 41 and the blower 63. Among these components, the exhaust side movable vane 64 is provided in a direction parallel to a mounting direction a of cells 53 that constitute the fuel cell 41 in a fully closed state as shown in FIGS. 3 and 4A.

Further, a plurality of the exhaust side movable vanes 64 and the exhaust side stationary vanes 65 are alternately provided in a direction β orthogonal to the mounting direction a of the cells 53 that constitute the fuel cell 41. As shown in FIG. 4A, a flow of the reaction air is adjusted by the exhaust side stationary vane 65 and exhaust side movable vane 64 in the fully closed state. Herein, a reference character A in FIG. 4A denotes an arrow indicating a flow direction of the reaction air.

An opening/closing state of the exhaust side movable vane 64 is changed in response to the state of the fuel cell 41, and particularly, to a temperature state of the fuel cell 41. In the fully opened state, the exhaust side movable vane 64 is expanded to block an air flow inside the exhaust duct 62 as shown in FIG. 4B.

That is, the exhaust side movable vanes 64A positioned on a central area of the exhaust duct 62 expand to both sides at the time of full opening, while the exhaust side movable vane 64B positioned in the vicinity of a wall surface of the exhaust duct 62 expands to one side at the time of full opening.

The adjacent exhaust side movable vanes 64 in the fully opened (expanded) state come into contact with each other, so that an opening in substantially a V-shape or substantially a U-shape (substantially a V-shape in this embodiment) that faces the fuel cell 41 is formed inside the exhaust duct 62. As a result, the exhaust side movable vane 64 in the fully opened state functions to temporarily block the reaction air discharged into the exhaust duct 62 from the exhaust port 55 of the fuel cell 41 and retaining the reaction air in a periphery of the fuel cell 41 so as to introduce the reaction air into the fuel cell 41.

Figure 4B:
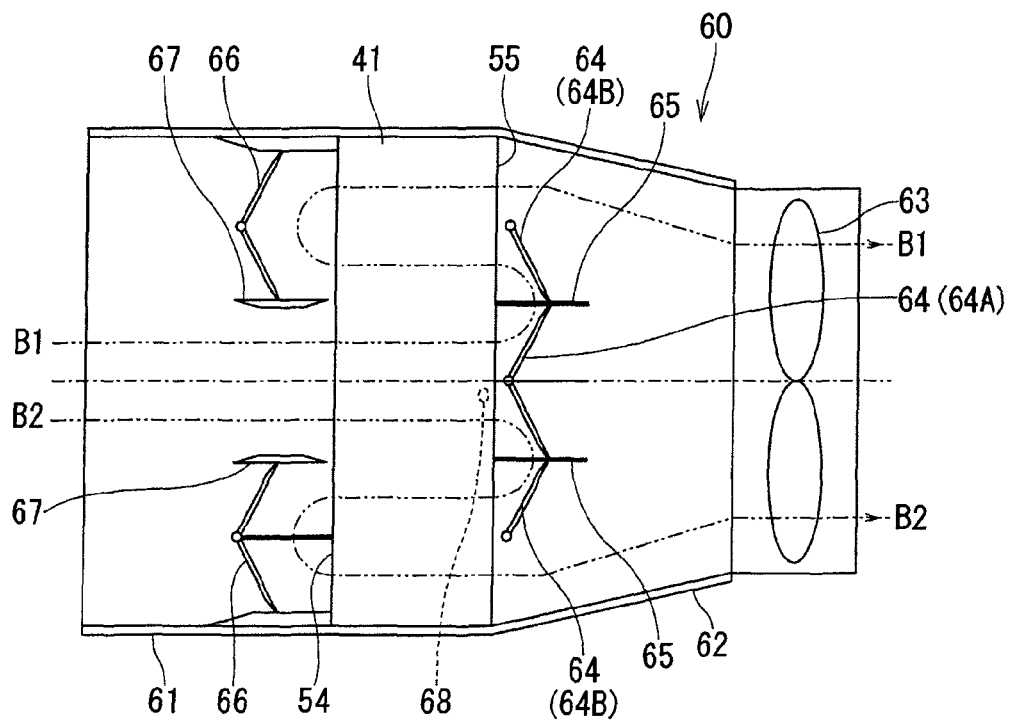

Further, herein, reference characters B1 and B2 in FIG. 4B denote an arrow indicating a flow direction of the reaction air.

The intake side movable vane 66 and the intake side stationary vane 67 are provided at a portion in the vicinity of the intake port 54 of the fuel cell 41 inside the intake duct 61, in which the intake side movable vane 66 is provided in the direction parallel to the mounting direction a of the cells 53 that constitute the fuel cell 41 in the fully closed state as shown in FIGS. 3 and 4A.

Further, a plurality of the intake side movable vanes 66 and the intake side stationary vanes 67 are provided in the direction β orthogonal to the mounting direction a of the cells 53 that constitute the fuel cell 41, in which the intake side stationary vanes 67 are positioned on the central area in the intake duct 61 and the intake side movable vanes 66 are positioned on the wall surface side of the intake duct 61. As shown in FIG. 4A, a flow of the reaction air is adjusted by these intake side stationary vanes 67 and intake side movable vanes 66 in the fully closed state.

An opening/closing state of the intake side movable vane 66 is changed in response to the state of the fuel cell 41, and particularly, to a temperature state of the fuel cell 41. In the fully opened state, the intake side movable vanes 66 are expanded to both sides to block an air flow path inside the intake duct 61 as shown in FIG. 4B. The adjacent intake side movable vanes 66 in the fully opened state form an opening in substantially a V-shape or substantially a U-shape (substantially a V-shape in this embodiment) that faces the fuel cell 41 inside the intake duct 61. As a consequence, the intake side movable vane 66 in the fully opened state functions to reverse a flow of the reaction air passing through the fuel cell 41 by means of the exhaust side movable vane 64 so as to introduce the reaction air into the fuel cell 41 again.

The temperature sensor 68 is positioned, for example, in the vicinity of the exhaust port 55 inside the fuel cell 41 and acts to detect temperature inside the fuel cell 41. The temperature detected by the temperature sensor 68 is outputted to, for example, the power controller 44 (FIG. 2) constituting a control unit of the exhaust side movable vane 64 and the intake side movable vane 66. The power controller 44 controls the exhaust side movable vane 64 and the intake side movable vane 66 so as to change the opening/closing states thereof in accordance with the detected temperature from the temperature sensor 68.

That is, during the normal operation period, when the detected temperature from the temperature sensor 68 is equal to or more than an appropriate operating temperature, the power controller 44 sets both the exhaust side movable vane 64 and the intake side movable vane 66 to take the fully closed state as shown in FIG. 4A. Accordingly, the intake side movable vane 66 adjusts a flow of the reaction air together with the intake side stationary vane 67 inside the intake duct 61, while the exhaust side movable vane 64 adjusts a flow of the reaction air together with the exhaust side stationary vane 65 inside the exhaust duct 62. As a result, the reaction air flows in parallel with the mounting direction a of the cells 53 of the fuel cell 41 as shown with an arrow A in FIG. 4A.

Furthermore, when the detected temperature from the temperature sensor 68 is less than the appropriate operating temperature, such as during the time of low-temperature start operation of the fuel cell 41, the power controller 44 sets both the exhaust side movable vane 64 and the intake side movable vane 66 in the fully opened (expanded) state as shown in FIG. 4B. Consequently, as shown with arrows B1 and B2 in FIG. 4B, the reaction air flowing a center portion inside the intake duct 61 is temporarily blocked and retained by the exhaust side movable vane 64 (exhaust side movable vanes 64A and 64B) after passing through the fuel cell 41. As a result, the flow of the reaction air is reversed and flows into the fuel cell 41 again, and after passing the fuel cell 41, the reaction air is temporarily blocked and retained by the intake side movable vane 66. Consequently, the flow is reversed and passes through the fuel cell 41 again, and then travels in the vicinity of the wall surface inside the exhaust duct 62 before being discharged to the outside by the blower 63.

As described above, when the reaction air repeatedly flows through the fuel cell 41, the reaction air is heated, so that the temperature of the fuel cell 41 promptly increases and reaches the appropriate operating temperature at an early stage. As a result, the starting performance of the fuel cell 41 at the time of the low temperature operation is enhanced.

Figure 5A:
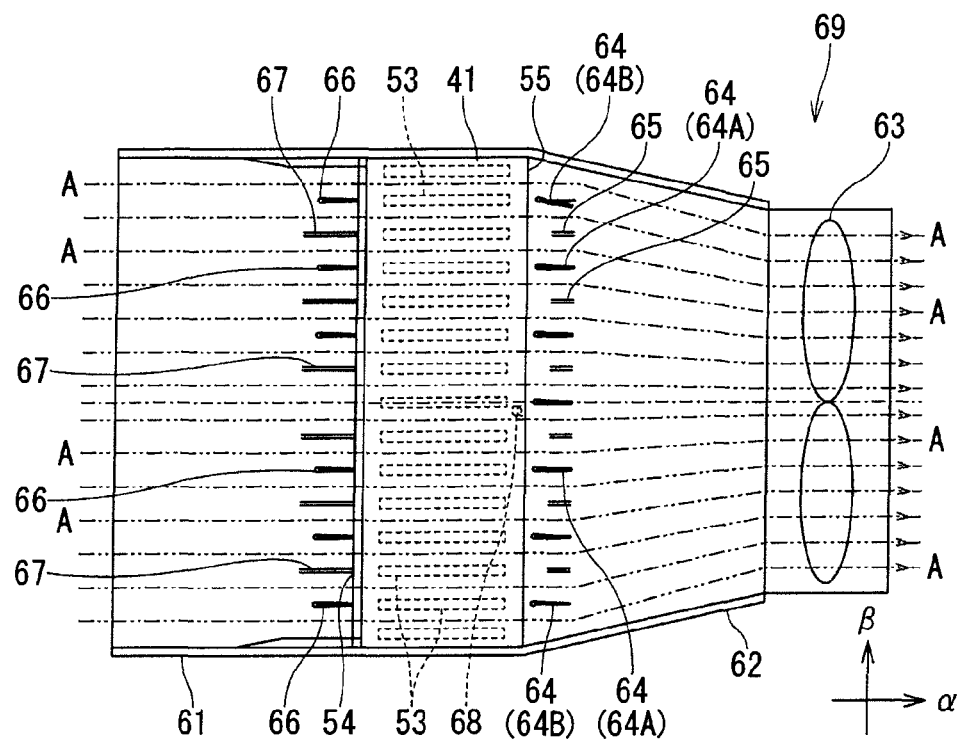
Figure 5B:
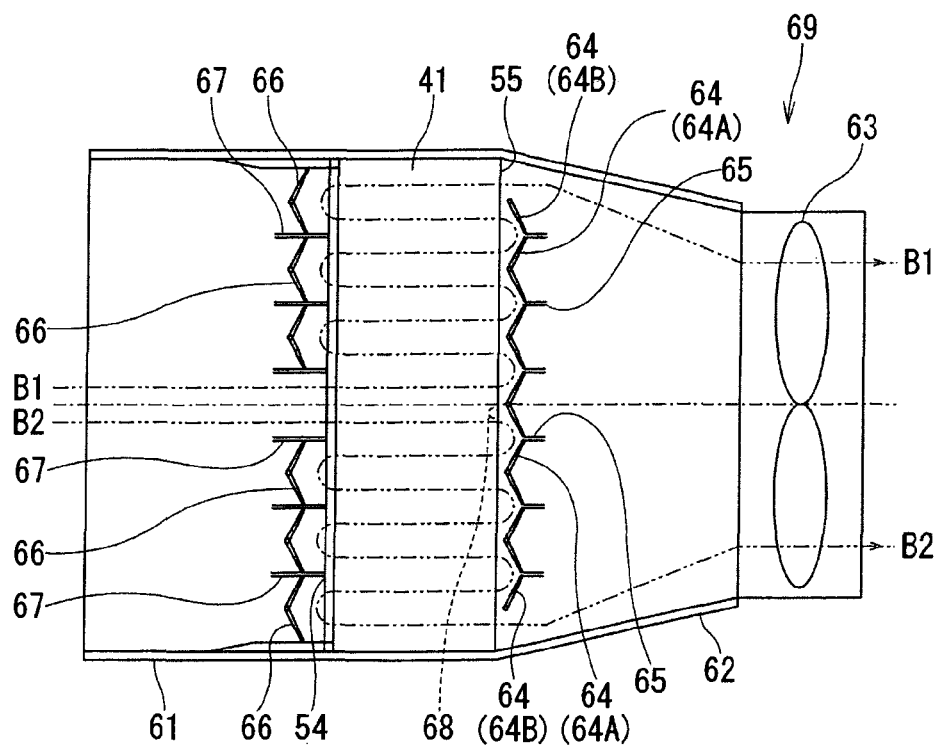

FIG. 5 shows a modification of the first embodiment in the air supply and exhaust structure for a fuel cell shown in FIG. 3. In an air supply and exhaust structure for a fuel cell 69 in this modification, the exhaust side movable vane 64 and the exhaust side stationary vane 65 are disposed inside the exhaust duct 62, and the intake side movable vane 66 and the intake side stationary vane 67 are disposed inside the intake duct 61 each in a larger number than that in the case shown in FIGS. 3 and 4 in the direction β orthogonal to the mounting direction α of the cells 53 that constitute the fuel cell 41.

Therefore, in the case of this modification, the frequency of the reaction air flowing through the fuel cell 41 increases by means of the exhaust side movable vane 64 and the intake side movable vane 66, so that the temperature of the fuel cell 41 increases more promptly.

According to the structures or configurations mentioned above of the present invention, the following advantageous effects (1) to (7) can be achieved.

(1) The exhaust side movable vane 64 disposed inside the exhaust duct 62 temporarily blocks the reaction air discharged from the fuel cell 41 and retains the reaction air in the periphery of the fuel cell 41 so as to introduce the reaction air to the fuel cell 41, and on the other hand, the intake side movable vane 66 disposed inside the intake duct 61 reverses a flow of the reaction air passing through the fuel cell 41 by means of the exhaust side movable vane 64 so as to introduce the reaction air into the fuel cell 41. Accordingly, since the reaction air is repeatedly introduced to the fuel cell 41 to thereby promote the increase in the temperature thereof, the fuel cell 41 through which the reaction air passes can promptly be heated up to the appropriate operating temperature. As a result, it becomes possible to enhance the starting performance of the fuel cell 41 at the time of a low temperature without causing upsizing and complication of the total structure.

(2) The exhaust side movable vane 64 and the intake side movable vane 66 are changed in their opening/closing states in response to a temperature state of the fuel cell 41 detected by the temperature sensor 68. Accordingly, in response to the temperature state of the fuel cell 41, a supply and exhaust amount of the reaction air which is supplied to the fuel cell 41 and discharged from the fuel cell 41 can be optimized, thus effectively enhancing the reaction efficiency of the fuel cell 41.

That is, at the time of, for example, cool-temperature start of the fuel cell 41, being at a temperature less than the appropriate operating temperature, the fuel cell 41 is promptly heated up to the appropriate operating temperature by putting the exhaust side movable vane 64 and the intake side movable vane 66 in the fully opened (expanded) state, which makes it possible to enhance the starting performance of the fuel cell 41 and to enhance the reaction efficiency of the fuel cell 41.

Further, in a time when the fuel cell 41 is at a temperature equal to or more than the appropriate operating temperature, the flow of the reaction air is adjusted inside the intake duct 61 and the exhaust duct 62 and the supply and exhaust amount of the reaction air is increased by putting the exhaust side movable vane 64 and the intake side movable vane 66 in the fully closed state, so that the reaction efficiency of the fuel cell 41 can be enhanced.

(3) The exhaust side movable vane 64 and the intake side movable vane 66 are provided in a direction parallel to the mounting direction a of the cells 53 that constitute the fuel cell 41 in the fully closed state. Accordingly, a contact area between the cells 53 of the fuel cell 41 and reaction air can be increased, and in addition, an effect of adjusting the flow of the reaction air by the exhaust side movable vane 64 and the intake side movable vane 66 can be enhanced, so that air intake/exhaust efficiency can be improved. As a result of these effects, the reaction efficiency of the fuel cell 41 can be enhanced. Furthermore, since the heat generated in the cells 53 of the fuel cell 41 is uniformly diffused, the increase in the temperature of the cells 53 of the fuel cell 41 can be achieved uniformly.

(4) The exhaust side movable vane 64 and the intake side movable vane 66 are disposed at a portion in the vicinity of the fuel cell 41. Accordingly, the reaction air which is heated in the fuel cell 41 by the exhaust side movable vane 64 and the intake side movable vane 66 in the fully opened (expanded) state can be made to flow into the fuel cell 41 again without being cooled. As a result, the fuel cell 41 can be heated still more promptly up to the appropriate operating temperature to thereby improve the starting performance of the fuel cell 41.

(5) The exhaust side movable vane 64 and the intake side movable vane 66 are disposed at a portion in the vicinity of the fuel cell 41. Accordingly, the exhaust side movable vane 64 and the intake side movable vane 66 in the fully closed state can adjust a flow of the reaction air in the vicinity of the fuel cell 41 so that the intake/exhaust efficiency of the fuel cell 41 can be enhanced and the reaction efficiency of the fuel cell 41 can be improved.

(6) The exhaust side movable vane 64 and the intake side movable vane 66 form an opening in substantially a V-shape or substantially a U-shape that faces the fuel cell 41 at the time of full opening (expansion), so that a flow of the reaction air that collided with the exhaust side movable vane 64 and the intake side movable vane 66 can easily be reversed. Accordingly, the reaction air is promoted to flow into the fuel cell 41 again, so that the fuel cell 41 can be heated still more promptly up to the appropriate operating temperature.

(7) Since the air supply and exhaust structure for a fuel cell 60 is applied as one of the fuel cell associated components or parts to the scooter type motorcycle 10 incorporating the fuel cell 41, the scooter type motorcycle 10, which is substantially driven in an outdoor operating environment involving a large temperature difference and which requires stable supply of a large current, can always stably achieve the performance of the fuel cell 41 on the constant basis.

[Second embodiment (FIGS. 6 to 8)]

Figure 6:
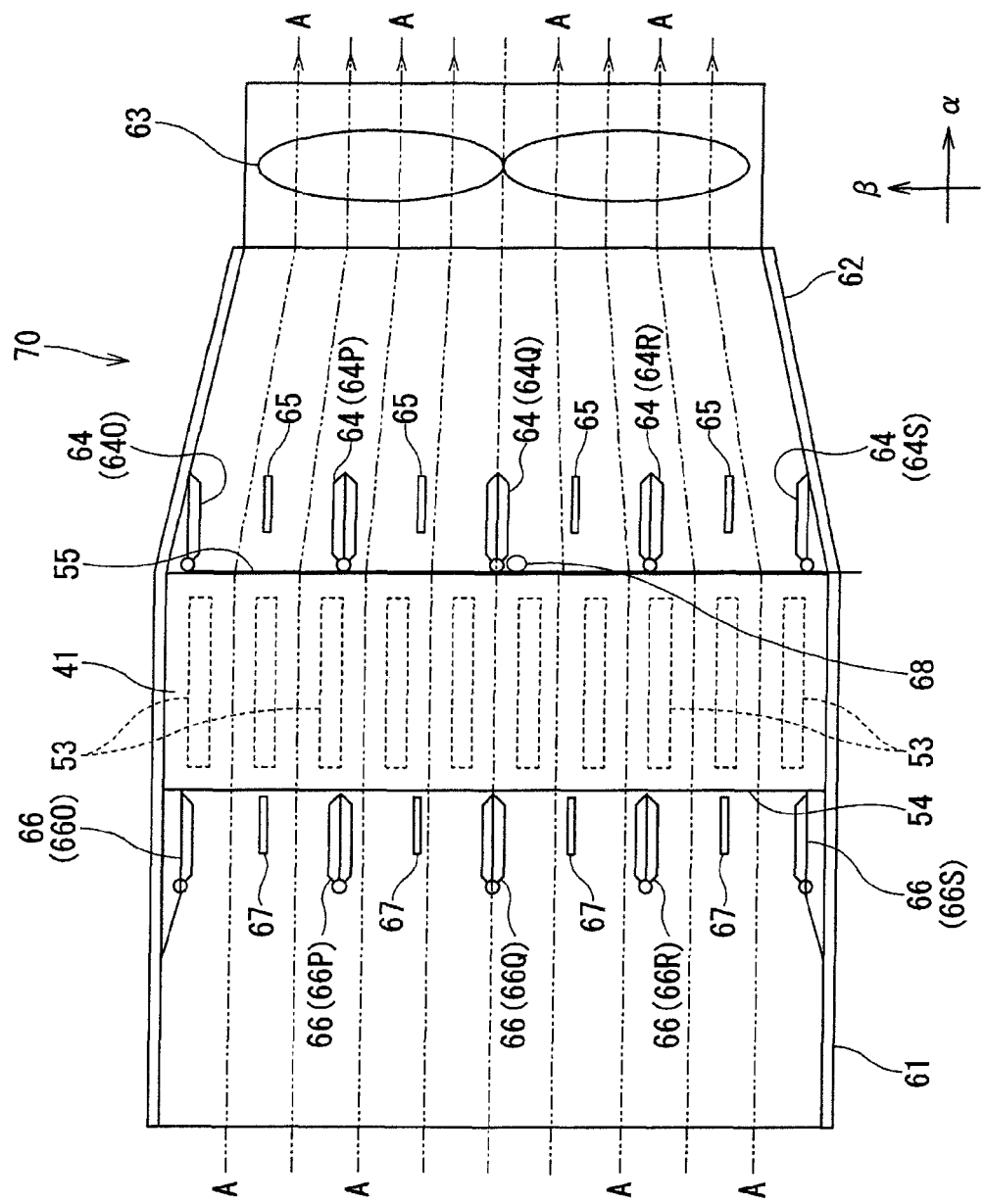
FIG. 6 is a plan view showing a second embodiment of the air supply and exhaust structure for a fuel cell according to the present invention in a state at a normal operation period.
Figure 7A:
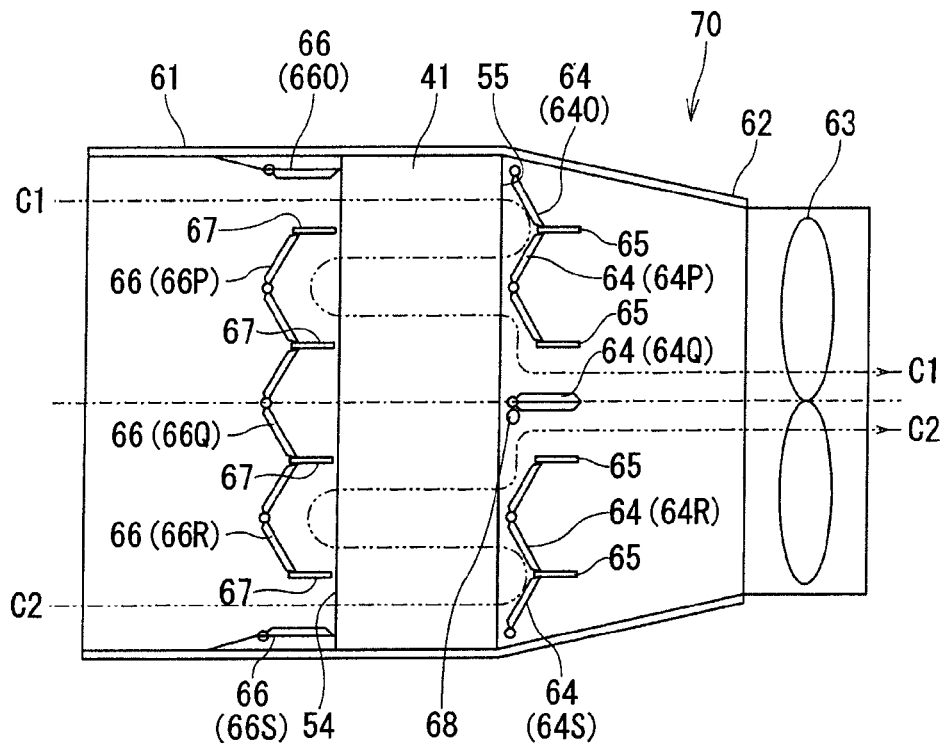
Figure 7B:
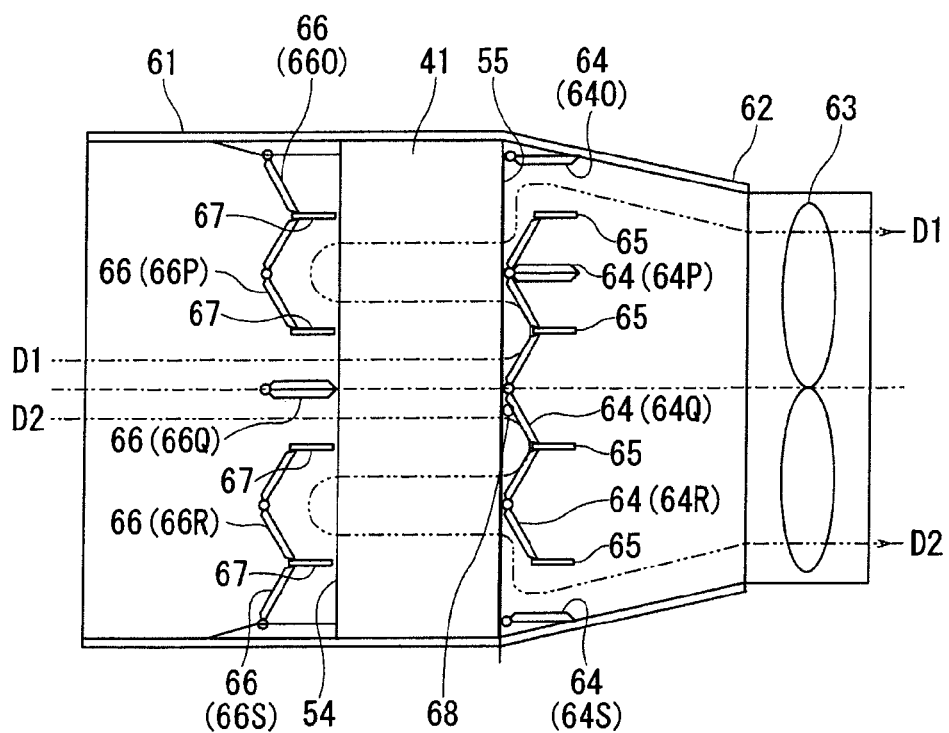

FIG. 6 is a plan view representing a second embodiment in the air supply and exhaust structure for a fuel cell according to the present invention during normal operation, and FIGS. 7A and 7B are plan views showing the air supply and exhaust structure for a fuel cell shown in FIG. 6, in which FIG. 7A shows a first pattern during low-temperature start and FIG. 7B shows a second pattern during low-temperature start.

Further, in the second embodiment, component members identical to those in the first embodiment are denoted by identical reference numerals to simplify or omit a duplicated description thereof.

An air supply and exhaust structure for a fuel cell 70 in the second embodiment is different from the first embodiment in the following points.

That is, at the time of, for example, low-temperature start of the fuel cell 41 when the fuel cell 41 is at a temperature less than the appropriate operating temperature, a first pattern where a part of the exhaust side movable vanes 64 and a part of the intake side movable vanes 66 are operated to be fully opened (expanded) and a second pattern where another part of the exhaust side movable vanes 64 and another part of the intake side movable vanes 66 are operated to be fully opened (expanded) are alternately performed. The temperature sensor 68 is provided in the periphery of the fuel cell 41, such as in the vicinity of the exhaust port 55 of the fuel cell 41 inside the exhaust duct 62.

That is, the exhaust side movable vanes 64 arranged in order in the direction β orthogonal to the mounting direction a of the cells 53 that constitute the fuel cell 41 are defined as exhaust side movable vanes 64O, 64P, 64Q, 64R and 64S, and on the other hand, the intake side movable vanes 66 placed in the same manner are defined as intake side movable vanes 66O, 66P, 66Q, 66R and 66S.

The first pattern is a pattern as shown in FIG. 7A where the exhaust side movable vanes 64O, 64P, 64R and 64S are operated to be fully opened (expanded) and the exhaust side movable vane 64Q is operated to be fully closed, while the intake side movable vanes 66P, 66Q and 66R are operated to be fully opened (expanded) and the intake side movable vanes 66O and 66S are operated to be fully closed.

In the first pattern, as shown with an arrow C1 in FIG. 7A, the reaction air passes the intake side movable vane 66O and flows into the fuel cell 41 from one wall side portion of the intake port 54. The reaction air passes through the fuel cell 41 by a plurality of times while reversing the flow thereof in order in the exhaust side movable vanes 64O and 64P and the intake side movable vane 66P, and the reaction air is then discharged through a center portion of the exhaust port 55 and the exhaust side movable vane 64Q.

Further, in the first pattern, as shown with an arrow C2 in FIG. 7A, the reaction air passes the intake side movable vane 66S and flows into the fuel cell 41 from another wall side portion (opposite to the one wall side portion) of the intake port 54. The reaction air passes through the fuel cell 41 by a plurality of times while reversing the flow thereof in order in the exhaust side movable vanes 64S and 64R and the intake side movable vane 66R, and the reaction air is then discharged through the center portion of the exhaust port 55 and the exhaust side movable vane 64Q.

The second pattern is a pattern, as shown in FIG. 7B, in which the exhaust side movable vanes 64P, 64Q and 64R are operated to be fully opened (expanded) and the exhaust side movable vanes 64O and 64S are operated to be fully closed, and on the other hand, the intake side movable vanes 66O, 66P, 66R and 66S are operated to be fully opened (expanded) and the intake side movable vane 66Q is operated to be fully closed.

In the second pattern, as indicated with an arrow D1 in FIG. 7B, the reaction air passes the intake side movable vane 66Q and flows into the fuel cell 41 from the center portion of the intake port 54. The reaction air passes through the fuel cell 41 by a plurality of times while reversing the flow thereof in order in the exhaust side movable vanes 64Q and 64P and the intake side movable vane 66P, and the reaction air is then discharged through the one wall side portion of the exhaust port 55 and the exhaust side movable vane 64O.

Further in the second pattern, as indicated with an arrow D2 in FIG. 7B, the reaction air passes the intake side movable vane 66Q and flows into the fuel cell 41 from the center portion of the intake port 54. The reaction air passes through the fuel cell 41 by a plurality of times while reversing the flow thereof in order in the exhaust side movable vanes 64Q and 64R and the intake side movable vane 66R, and the reaction air is then discharged through the another wall side portion of the exhaust port 55 and the exhaust side movable vane 64S.

Figure 8A:
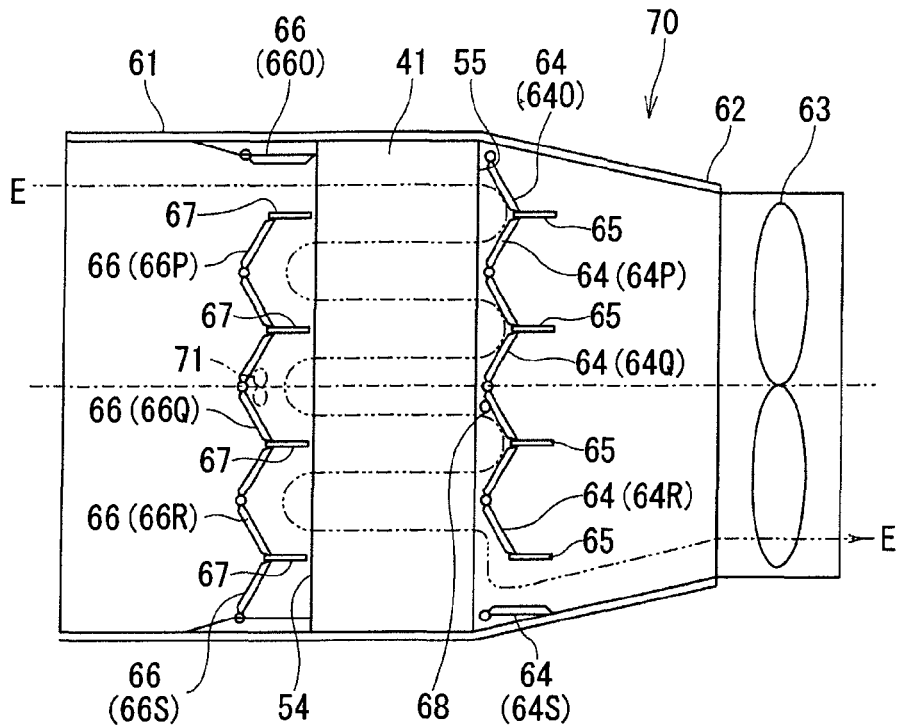
Figure 8B:
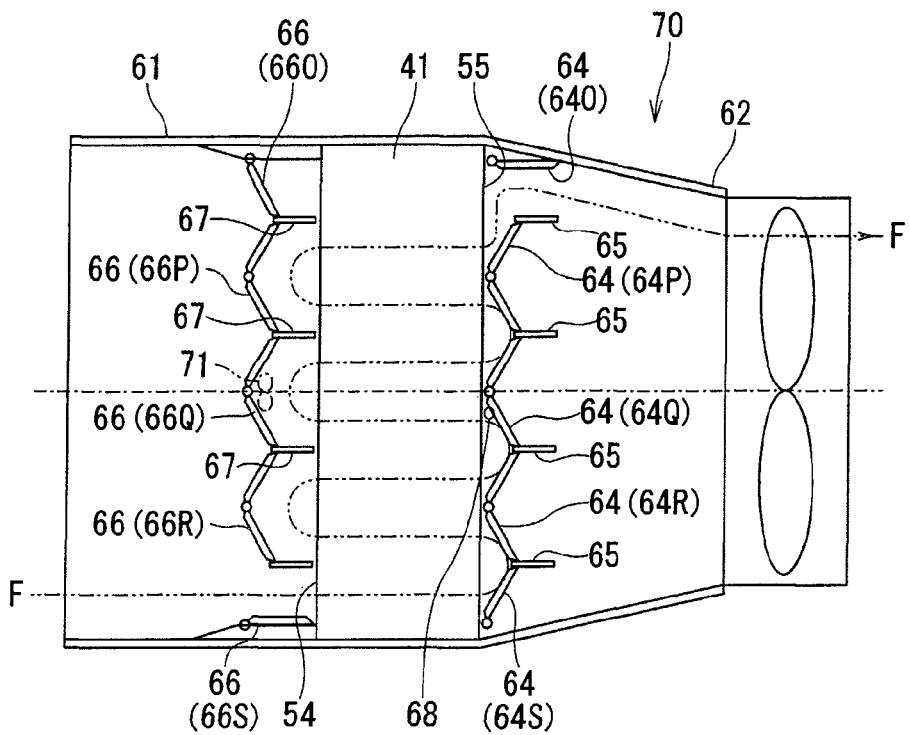

It is to be noted that in the air supply and exhaust structure for a fuel cell 70 in the second embodiment, a third pattern shown in FIG. 8A in which a part of the exhaust side movable vanes 64 and a part of the intake side movable vanes 66 are operated to be fully opened (expanded), and a fourth pattern shown in FIG. 8B in which another part of the exhaust side movable vanes 64 and another part of the intake side movable vanes 66 are operated to be fully opened (expanded) may alternately be performed at the time of a low-temperature start of the fuel cell 41 of a temperature, for example, less than the appropriate operating temperature.

The third pattern is a pattern as shown in FIG. 8A in which the exhaust side movable vanes 64O, 64P, 64Q and 64R are operated to be fully opened (expanded) and the exhaust side movable vane 64S is operated to be fully closed, and on the other hand, the intake side movable vanes 66P, 66Q, 66R and 66S are operated to be fully opened (expanded) and the intake side movable vane 66O is operated to be fully closed.

In the third pattern, as indicated with an arrow E in FIG. 8A, the reaction air passes the intake side movable vane 66O and flows into the fuel cell 41 from the one wall side portion of the intake port 54. The reaction air passes through the fuel cell 41 by a plurality of times while reversing the flow thereof in order in the exhaust side movable vanes 64O and 64P, the intake side movable vane 66P, the exhaust side movable vanes 64P and 64Q, the intake side movable vane 66Q, the exhaust side movable vanes 64Q and 64R, and the intake side movable vane 66R, and the reaction air is then discharged through the another wall side portion of the exhaust port 55 and the exhaust side movable vane 64S.

The fourth pattern is a pattern as indicated in FIG. 8B in which the exhaust side movable vanes 64P, 64Q, 64R and 64S are operated to be fully opened (expanded) and the exhaust side movable vane 64O is operated to be fully closed, while the intake side movable vanes 66O, 66P, 66Q and 66R are operated to be fully opened (expanded) and the intake side movable vane 66S is operated to be fully closed. In the fourth pattern, as indicted with an arrow F in FIG. 8B, the reaction air passes the intake side movable vane 66S and flows into the fuel cell 41 from the other wall side portion of the intake port 54.

The reaction air passes through the fuel cell 41 a plurality of times while reversing the flow thereof in order in the exhaust side movable vanes 64S and 64R, the intake side movable vane 66R, the exhaust side movable vanes 64R and 64Q, the intake side movable vane 66Q, the exhaust side movable vanes 64Q and 64P, and the intake side movable vane 66P, and the reaction air is then discharged through the one wall side portion of the exhaust port 55 and the exhaust side movable vane 64O.

Accordingly, as described hereinabove, in the second embodiment, the following effects (8) and (9) are also achieved in addition to the effects (1) to (7) achieved by the first embodiment.

(8) At the time of, for example, low-temperature start of the fuel cell 41 when the fuel cell 41 is at a temperature less than the appropriate operating temperature, the first pattern (or the third pattern) where a part of the exhaust side movable vanes 64 and a part of the intake side movable vanes 66 are operated to be fully opened (expanded) and the second pattern (or the fourth pattern) in which another part of the exhaust side movable vanes 64 and another part of the intake side movable vanes 66 are operated to be fully opened (expanded) are alternately performed, so that the temperature of a plurality of the cells 53 in the fuel cell 41 can be increased uniformly.

(9) In the air supply and exhaust structure for a fuel cell 70, a large number of the exhaust side movable vanes 64 and the intake side movable vanes 66 are disposed along the direction β orthogonal to the mounting direction α of the cells 53 that constitute the fuel cell 41. Accordingly, if all the exhaust side movable vanes 64 and the intake side movable vanes 66 are made to the fully opened (expanded) state when the fuel cell 41 is not in use, the entire or a part of the intake duct 61 can be blocked by the intake side movable vanes 66 in the expanded state, and the entire or a part of the exhaust duct 62 can be blocked by the exhaust side movable vanes 64 in the expanded state. As a result, the fuel cell 41 can be protected from foreign materials which may invade through the intake duct 61 and the exhaust duct 62.

Although the preferred embodiments of the present invention have been described hereinbefore, the present invention is not limited to the described specific configuration of each embodiment, and various changes and/or modifications may be made without departing from the scope of the appended claims.

For example, in the air supply and exhaust structure for a fuel cell 70 shown in FIGS. 8A and 8B, one or a plurality of small-size blowers 71 may be provided between the intake port 54 and the intake side movable vane 66 of the fuel cell 41 as shown with the two-dot chain line in FIGS. 8A and 8B to assist a flow of the reaction air that repeatedly passes through the fuel cell 41 so as to prevent a flow rate of the reaction air from decreasing.

Furthermore, the temperature sensors 68 in the first and second embodiments may be replaced with a plurality of the temperature sensors along the direction β orthogonal to the mounting direction α of the cells 53 in the fuel cell 41, and the plurality of these temperature sensors 68 may function as a temperature distribution detection unit that detects a temperature distribution inside and around the fuel cell 41. In this case, the power controller 44 separately changes the respective opening/closing states of a plurality of the exhaust side movable vanes 64 and intake side movable vanes 66 based on the temperature distribution of the fuel cell 41 detected by the plural temperature sensors 68. Accordingly, by opening and closing the exhaust side movable vanes 64 and the intake side movable vanes 66 so as to pass the reaction air repeatedly through the low-temperature portions in the fuel cell 41, deviation or variation in the temperature distribution of the fuel cell 41 can be improved, and the temperature of the entire fuel cell 41 can efficiently be increased.

What is claimed is:
1. An air supply and exhaust structure for supplying a reaction air to a fuel cell and exhausting the reaction air passing through the fuel cell, the air supply and exhaust structure comprising:

a controller;

a temperature detection unit that detects temperature inside or around the fuel cell, wherein a state of the fuel cell is based on the temperature detected by the temperature detection unit;

an intake duct coupled to the fuel cell and positioned such that reaction air is guided to the fuel cell via the intake duct;

an intake side shield unit including a movable vane positioned inside the intake duct and under the control of the controller;

an exhaust duct coupled to the fuel cell and positioned such that that the reaction air passing through the fuel cell is discharged to an outside of the fuel cell via the exhaust duct;

a blower provided in the exhaust duct having a structure and positioned such that the reaction air passing through the fuel cell is drawn out to promote discharge of the reaction air; and an exhaust side shield unit that includes a moveable vane to be opened or closed under the control of the controller, wherein the exhaust side shield unit movable vane is disposed inside the exhaust duct and positioned between the fuel cell and the blower, wherein the movable vane of the exhaust side shield unit is positioned so as to deflect flow of the reaction air passing from the intake duct side to the exhaust duct side of the fuel cell so as to deflect the reaction air from the exhaust duct side toward the intake duct side through the fuel cell, wherein the controller is programmed to control the position of the intake shield unit movable vane and to control the exhaust side shield unit movable vane to be opened or closed in response to the state of the fuel cell so as to temporarily block the reaction air discharged from the fuel cell and to retain the reaction air in a periphery of the fuel cell so as to introduce the deflected reaction air to the fuel cell, and wherein, through interaction of the exhaust side shield unit movable vane and the intake side shield unit movable vane under the control of the controller, the reaction air passes within the fuel cell a plurality of times.

2. The air supply and exhaust structure for the fuel cell according to claim 1, wherein the exhaust side shield unit movable vane is positioned in a direction parallel to a mounting direction of cells constituting the fuel cell when the exhaust side shield unit movable vane is in a fully closed state.

3. The air supply and exhaust structure for a fuel cell according to claim 1, wherein the exhaust side shield unit comprises a plurality of exhaust side shield unit movable vanes including the exhaust side shield unit movable vane, wherein the plurality of exhaust side shield unit movable vanes are placed in a direction orthogonal to a mounting direction of cells constituting the fuel cell, and respective opening or closing states of the plurality of the exhaust side shield unit movable vanes are separately changed based on temperature distribution detected by the temperature detection unit.

4. The air supply and exhaust structure for a fuel cell according to claim 1, wherein the exhaust side shield unit movable vane forms an opening in substantially a U-shape or substantially a V-shape that faces the fuel cell.

5. A fuel cell mounted vehicle comprising:

an air supply and exhaust structure for supplying a reaction air to the fuel cell and exhausting the reaction air passing through the fuel cell, wherein the air supply and exhaust structure includes:

a controller;

a temperature detection unit that detects temperature inside or around the fuel cell, wherein a state of the fuel cell is based on the temperature detected by the emperture detection unit;

an intake duct coupled to the fuel cell and positioned such that reaction air is guided to the fuel cell via the intake duct, an intake side shield unit including a movable vane positioned inside the intake duct and under the control of the controller;

an exhaust duct coupled to the fuel cell and positioned such that that the reaction air passing through the fuel cell is discharged to an outside of the fuel cell via the exhaust duct;

a blower provided in the exhaust duct having a structure and positioned such that the reaction air passing through the fuel cell is drawn out to promote discharge of the reaction air;

an exhaust side shield unit that includes a moveable vane to be opened or closed under the control of the controller, wherein the exhaust side shield unit movable vane is disposed inside the exhaust duct and positioned between the fuel cell and the blower, wherein the movable vane of the exhaust side shield unit is positioned so as to deflect flow of the reaction air passing from the intake duct side to the exhaust duct side of the fuel cell so as to deflect the reaction air from the exhaust duct side toward the intake duct side through the fuel cell, wherein the controller is programmed to control the position of the intake shield unit movable vane and to control the exhaust side shield unit movable vane to be opened or closed in response to the state of the fuel cell so as to temporarily block the reaction air discharged from the fuel cell and to retain the reaction air in a periphery of the fuel cell so as to introduce the deflected reaction air to the fuel cell, and wherein, through interaction of the exhaust side shield unit movable vane and the intake shield unit movable vane under the control of the controller, the reaction air passes within the fuel cell a plurality of times.

\* \* \* \* \*